April 8, 1969   M. J. BOZICH   3,437,384
CONVEYING SYSTEM AND VALVE CONSTRUCTIONS THEREFOR
Filed Nov. 14, 1967   Sheet 1 of 2
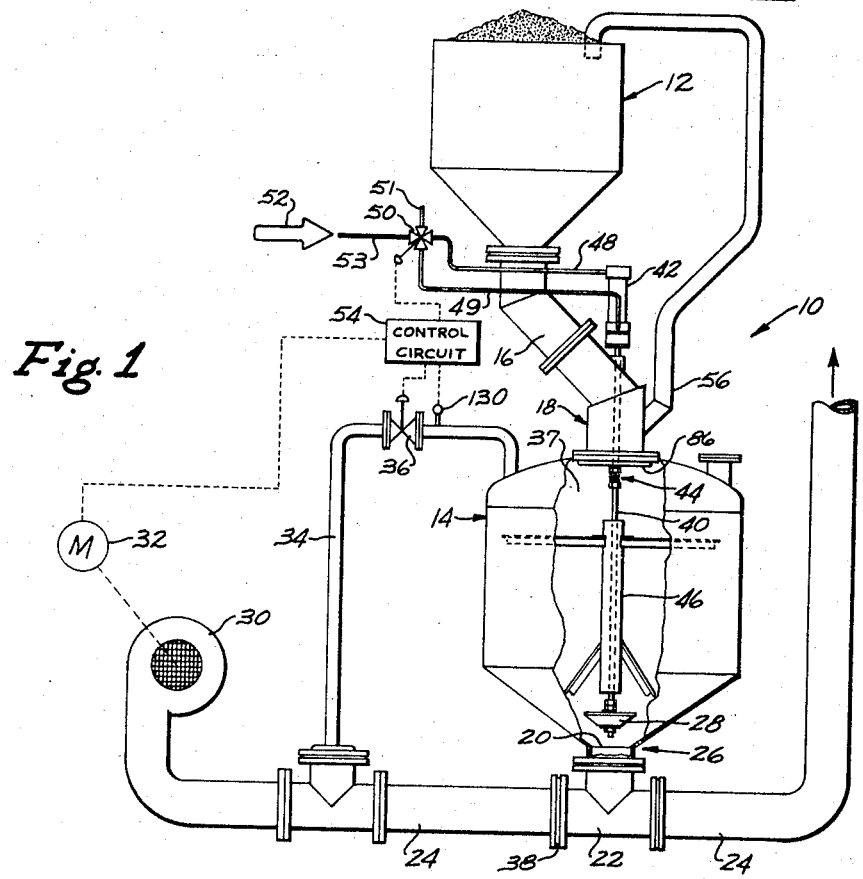
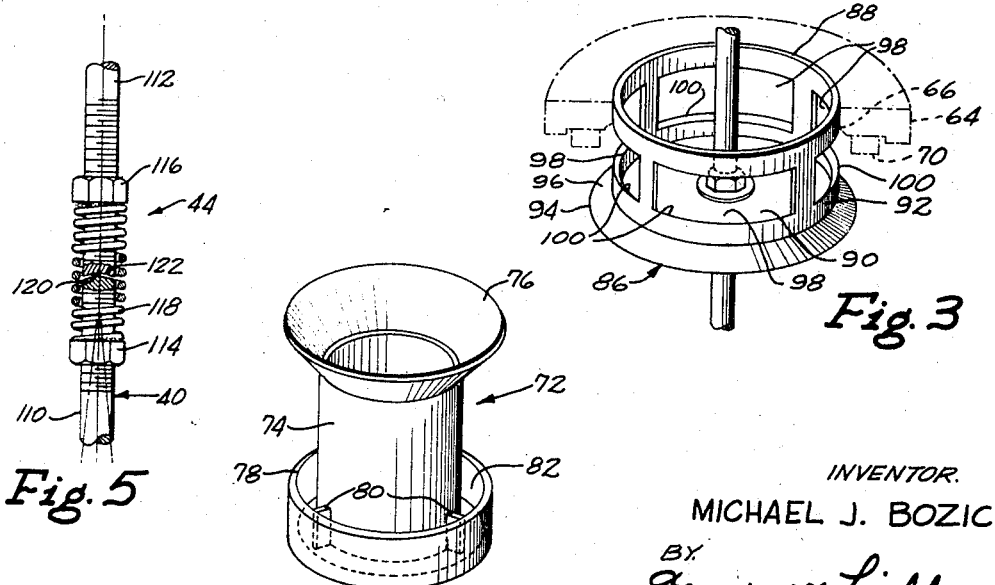
INVENTOR.
MICHAEL J. BOZICH
BY Murray & Linkhauer
ATTORNEYS April 8, 1969    M. J. BOZICH    3,437,384
CONVEYING SYSTEM AND VALVE CONSTRUCTIONS THEREFOR
Filed Nov. 14, 1967    Sheet 2 of 2
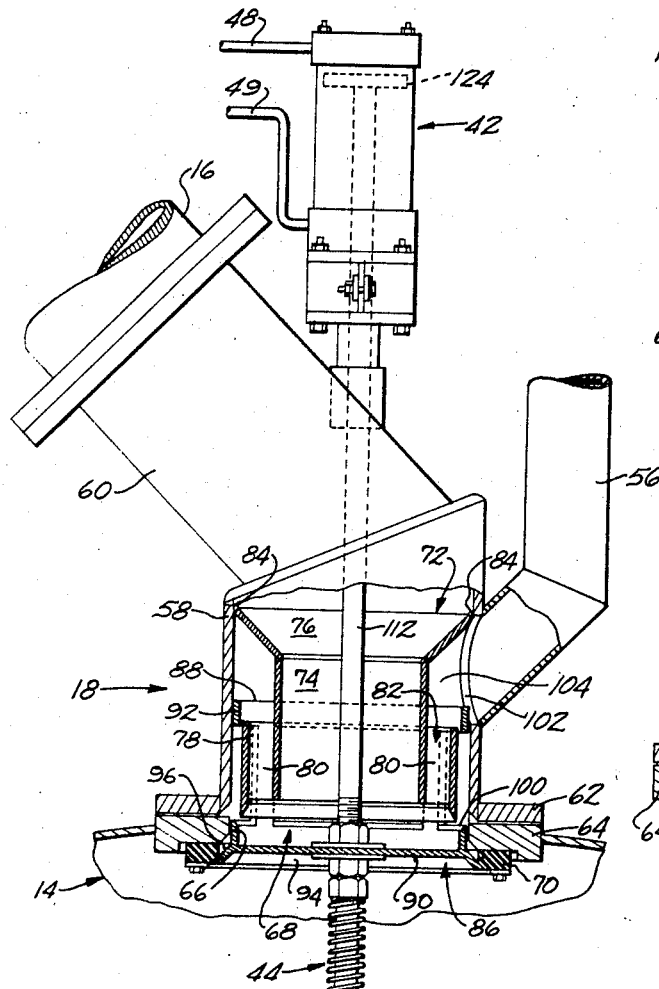
Fig. 2
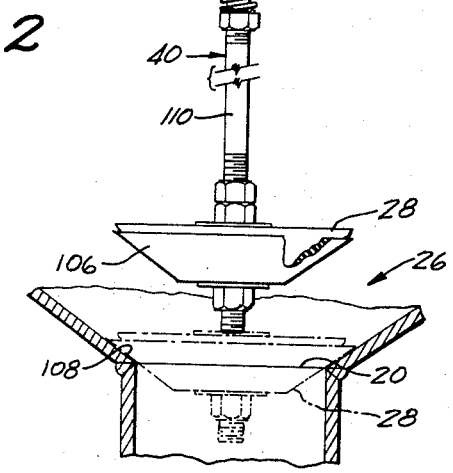
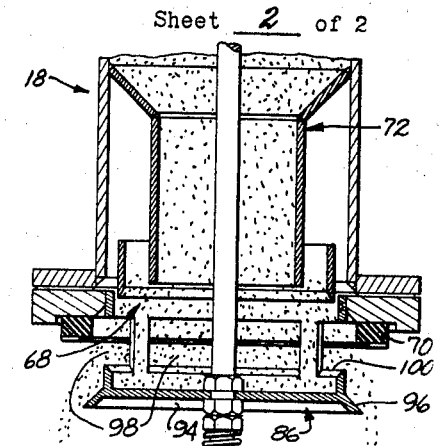
Fig. 6A
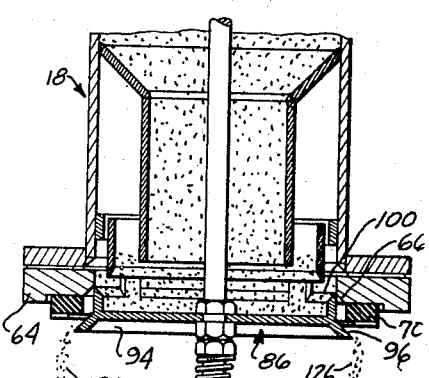
Fig. 6B
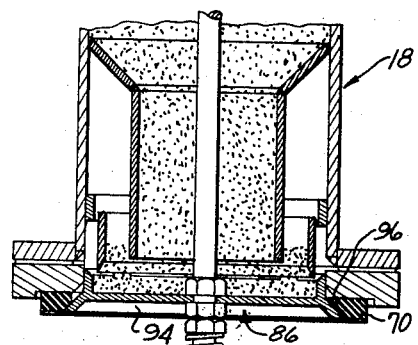
Fig. 6C
INVENTOR.
MICHAEL J. BOZICH
BY
Murray & Linkhauer
ATTORNEYS United States Patent Office 3,437,384
Patented Apr. 8, 1969

3,437,384
CONVEYING SYSTEM AND VALVE
CONSTRUCTIONS THEREFOR
Michael J. Bozich, 1059 Bayridge Ave.,
Pittsburgh, Pa. 15226
Filed Nov. 14, 1967, Ser. No. 682,858
Int. Cl. B65g 53/36, 53/40
U.S. Cl. 302—53
10 Claims

ABSTRACT OF THE DISCLOSURE

A system for pneumatically conveying solid granular materials from a delivery bin through a conveying conduit carrying compressed gas. The delivery bin is provided with an inlet valve and an outlet valve operable in unison by a single motor means. The valves are operated reciprocally such that when the outlet valve is closed the inlet valve is opened to admit granular materials from a supply bin into the delivery bin. Conversely, when the inlet valve is closed, the outlet valve is opened to discharge granular materials from the delivery bin to the conveying conduit.

BACKGROUND OF THE INVENTION

Field of the invention

This invention relates to pneumatic conveying systems for solid granular materials and the like, and more particularly to the construction and operation of inlet and outlet valve means for controlling the flow of such granular materials into and out of a delivery bin.

Description of the prior art

It is a normal practice to introduce pressurized air into the space above the granular material in a delivery hopper. The pressurized air provides a force for driving the material from the delivery bin into the conveying conduit. It is important that a substantally gas-tight seal be made at the inlet opening of the delivery hopper in order to take advantage of the full force provided by the thus introduced pressurized air. A gas-tight seal has been difficult to obtain since solids occasionally hang-up on the sealing surfaces of the closure or valve mechanism provided at the inlet opening of the delivery bin.

Another disadvantage of prior systems results from the fact that the discharge opening of the delivery bin remains open at all times during the operation of the system. When the delivery bin is being filled, granular material flows through the discharge opening into the conveying conduit. As the delivery bin is filled, the granular material in the conveying conduit occasionally becomes so packed that it is extremely difficult to dislodge this material on start-up of the conveying system.

SUMMARY OF THE INVENTION

The principal object of the present invention is to provide improvements in the construction and operation of pneumatic conveying systems of the type described.

Another object of the present invention is to provide a novel inlet valve by which a gas-tight seal may be made at the inlet opening of a delivery bin.

Still another object of the present invention is to provide an outlet plug valve arrangement for closing the delivery bin outlet opening during filling of the bin, thereby preventing the formation of a packed plug of granular material in the conveying conduit.

A further object of the present invention is to provide an improved delivery bin having inlet and outlet valves associated with the inlet and outlet openings, the valves being operable in unison such that when the bin is being filled, the outlet opening is closed and when materials are being discharged from the bin, the inlet opening is closed.

A still further object of the present invention is to provide an outlet plug for closing the discharge opening, the outlet plug being deflectable into mating engagement with the discharge opening to insure a closing thereof.

The valve means and valve arrangement of the present invention are particularly useful in delivery bins of the type having an inlet opening through which granular materials are received from a supply bin disposed thereabove, a discharge opening through which the granular materials are discharged into a conveying conduit which carries compressed gas for conveying the materials, and a supply conduit communicating compressed gas to the interior of the delivery bin above the granular materials stored therein.

In accordance with the present invention, inlet valve means is provided for closing the inlet opening and providing a gas-tight seal therefor. The present inlet valve means includes an inlet plug movable into and out of the inlet opening and gasket means surrounding the inlet opening. The inlet plug includes a leading end and a sealing surface spaced from the leading end. The overall arrangement of the present valve means is such that when the inlet plug is moved toward the inlet opening, that is, when the inlet valve is being closed, the leading end closes the inlet opening to prevent further influx of granular material and thereafter the sealing surface engages the gasket means to provide a gas-tight seal at the inlet opening.

The time required to move the inlet plug from a position wherein the leading end closes the inlet opening to a position wherein the sealing surface engages the gasket means, is sufficient to permit all granular material to fall or slide from the sealing surface. Thus, the sealing surface is substantially free of granular materials before it engages the gasket means and a gas-tight seal at the inlet opening is assured.

Also, in accordance with the present invention, outlet valve means is provided for closing the discharge opening when the delivery bin is being refilled. The outlet opening comprises an outlet plug connected to the inlet plug by a flexible connection which permits the outlet plug to be deflected into mating engagement with the discharge opening. The inlet and outlet plugs are movable by a single motor means positioned externally of the delivery bin.

BRIEF DESCRIPTION OF THE DRAWINGS

FIGURE 1 is a front elevation view of a pneumatic conveying system incorporating the improved delivery bin of the present invention;

FIG. 2 is a fragmentary cross sectional view on an enlarged scale illustrating the inlet and outlet valve means and valve operation of the present invention;

FIG. 3 is an isometric view of an inlet plug;

FIG. 4 is an isometric view of a funnel member used in the present inlet valve means;

FIG. 5 is a fragmentary side view of a resilient connection between the inlet and outlet plugs; and FIGS. 6A, 6B and 6C are cross sectional views of the present inlet valve means illustrating the closing sequence thereof.

Referring now to FIG. 1, there is illustrated a pneumatic conveying system 10 including a supply bin 12 which stores granular materials for filling a delivery bin 14 through an interconnecting duct 16 having inlet valve means 18 of the present invention incorporated therein. The granular materials within the delivery bin 14 are discharged through an outlet opening 20 communicating with a T-fitting 22 provided in a materials conveying conduit 24. Outlet valve means 26 including an outlet plug 28 is provided for closing the outlet opening 20 when the bin 14 is being refilled.

The materials conveying conduit 24 receives compressed gas, such as air, from a compressor or blower 30 operated by motor 32. As is conventional, an auxiliary conduit 34 having a control valve 36 in corporated therein, conveys compressed gas from the conduit 24 to the upper region 37 of the delivery bin 14 above the granular materials therein. An orifice plate 38 is provided downstream of the auxiliary conduit 24, for example, at the T-fitting 22. The orifice plate 38 creates a back pressure upstream of the T-fitting 22 such that the gas pressure within the upper region 37 of the delivery bin 14 is greater than the gas pressure within the T-fitting 22, thereby providing a force for moving the granular materials through the outlet opening 20.

The inlet and outlet valve means 18, 26 are connected by rod means 40 which, in turn, is connected to motor means 42 which operates the valve means 18, 26 in unison, as will be described. The rod means 40 includes a flexible connection 44 which permits the outlet plug 28 to be deflected in mating engagement with the outlet opening 20 to insure complete closing thereof. The rod means 40 is enclosed over a major portion of its length in a sleeve 46 suitably supported within the delivery bin 14.

The motor means 42 may comprise a double-acting, pneumatically-operated motor of the piston and cylinder type which receives a compressed gas, such as air, through conduits 48, 49 communicating with the interior of the motor means 42 above and below the piston. A two-way control valve 50 having a vent port 51 controls the introduction of compressed gas through conduit 53 alternately into the conduits 48, 49. A source of compressed gas is schematically illustrated by the arrow 52.

The blower motor 32 and the control valves 36, 50 are operated by a control circuit schematically illustrated at 54. The operation of the entire system will be described later in the specification.

A vent duct 56 communicates with the interior of the inlet valve means 18 and extends therefrom to the supply bin 12. The vent duct 56 serves to vent the gas pressure within the delivery bin 14 when the inlet valve means 18 is opened for refilling the bin 14.

INLET VALVE MEANS 18

Referring now to FIGS. 2, 3 and 4, the inlet valve means 18 comprises a valve body 58 of circular cross section, having a duct segment 60 secured at its upper end and forming part of the interconnecting duct 16; and a valve flange 62 secured to a mounting flange 64 of the delivery bin 14. The mounting flange 62 has an inner perimeter edge 66 defining a flow passageway or opening 68 through which granular materials are admitted into the delivery bin 14. Gasket means 70 formed, for example, from pure gum rubber, surrounds the flow passageway 68 and is secured to the mounting flange 64.

The inlet valve means 18 additionally includes a funnel-shaped member 72, best seen in FIG. 4, which comprises a tubular segment 74 having an outwardly flared rim 76 at its upper end and a cylindrical plate 78 secured to the lower end of the tubular segment 74 by a plurality of radial fins 80. The cylindrical plate 78 is concentric with the tubular segment 74 and cooperates therewith to define an annular space 82.

As shown in FIG. 2, the funnel-shaped member 72 resides within the valve body 58. The outwardly flared rim 76 is secured to the valve body 58 by welds 84 such that all granular material flowing through the interconnecting duct 16 must flow through the funnel-shaped member 72.

The inlet valve means 18 additionally includes a plug or closure 86 best shown in FIG. 3. The plug 86 comprises a cup-shaped member 88 having a transverse wall 90 and a cylindrical side wall 92. A skirt 94 surrounds the transverse wall 90 and presents a sealing surface 96 which is inclined outwardly and away from the cylindrical wall 92. A plurality of openings 98 is provided in the cylindrical wall 92. In this instance, the openings 98 have a rectangular configuration presenting a leading edge 100 which, as will be more fully explained, serve to close the flow passageway 68 while the sealing surface 96 of skirt 94 is still spaced from the gasket means 70.

As can best be seen in FIG. 2, the cylindrical side wall 92 of the plug 86 is disposed in telescoping relation with the valve body 58 and is movable into and out of the flow passageway 68 in the space between the valve body 58 and the cylindrical plate 78 of the funnel-shaped member 72.

The valve body 58 is provided with an opening 102 with which the vent duct 56 communicates with an annular space 104 between the valve body 58 and the funnel-shaped member 72. When the inlet valve means 18 is opened, the compressed gas within the delivery bin 14 is vented through the flow passageway 68, the annular space 104 and through the vent duct 56. Any granular materials entrained by the vented gas are conveyed by the vent duct to the supply bin 12 by the vent duct 56 (see FIG. 1).

OUTLET VALVE MEANS 26

Referring still to FIG. 2, the outlet valve means 26 includes an outlet plug 28 provided with a resilient cover 106, preferably formed from rubber, presented in opposed relation with that inner surface 108 of the delivery bin 14 which defines the outlet opening 20. The plug 28 is movable into mating engagement with the outlet opening 20 as shown in dash-dot outline, to seal the same while the delivery bin 14 is being refilled.

The flexible connection 44 compensates for any misalignment of the plug 28 relative to the outlet opening 20. The flexible connection 44, as best shown in FIG. 5, comprises first and second rod segments 110, 112 having threaded end portions receiving nuts 114, 116. A spring 118 extends between the nuts 114, 116 and has its opposite ends secured thereto as by tack-welding or brazing. The first and second rod members 110, 112 include adjacent rod ends having mating convex and concave end surfaces 120, 122, respectively, serving as a pivot whereby the first rod segment is angularly deflectable in all directions. The spring 118 also permits slight lateral movement of the first rod segment 110 relative to the second rod segment 112.

Returning now to FIG. 2, the outlet plug 28 is secured to the lower end of the first rod segment 110 and, through the flexible connection 44, is deflectable into mating sealing engagement with the outlet opening 20.

The inlet plug 86 is secured to the second rod segment 112 which extends upwardly through the valve body 58 and is attached to a piston 124 of the motor means 42. Thus, the motor means 42 serves to operate the inlet and outlet valve means 18, 26 in unison and reciprocally, that is, when the inlet valve means 18 is open the outlet valve means 26 is closed and vice versa.

OPERATION OF INLET VALVE MEANS 18

Reference is now directed to FIGS. 6A, 6B and 6C, for a description of the sequence in which the inlet valve means 18 is closed and a gas-tight seal is made at the flow passageway 68.

In FIG. 6A, granular materials flow freely through the funnel-shaped member 72 out through the flow passageway 68 and the openings 98 in the inlet plug 86. The delivery bin is being filled.

When the delivery bin is filled to the desired level, the motor means 42 (FIG. 2) is activated pulling the inlet plug 86 into the flow passageway 68. When the leading edges 100 of the openings 98 are in juxtaposition with the perimeter edge 66 of the mounting flange 64 as shown in FIG. 6B, the flow of granular materials into the bin is stopped. The last few grains 126 of granular material slide off the inclined sealing surface 96 and render it substantially free of solids. The sealing surface 96 then engages and compresses the gasket means 70, as shown in FIG. 6C, to form a gas-tight seal.

OPERATION OF SYSTEM

Referring again to FIG. 1, the blower motor may run continuously during both filling and discharge of the bin 14. When the delivery bin 14 requires filling, the control valve 36 is closed. Thereafter, the control valve 50 is energized allowing compressed air to be conveyed through the conduit 48 to the motor means 42 at which time the rod means 40 is displaced in a downward direction. When the gas-tight seal at the inlet valve means 18 is broken, the compressed air within the delivery bin 14 is vented, along with any granular materials entrained thereby, through the inlet valve means 18 and the vent duct 56 to the supply bin 12. Downward movement of the rod means 40 will cause the inlet plug 86 to move out of the inlet valve means 18 allowing granular materials to flow from the supply bin 12 into the delivery bin 14. Simultaneously, the outlet valve means 26 is closed, that is, the outlet plug 28 is moved into mating engagement with the outlet opening 20.

It should be noted that with outlet valve means 26 closed, the delivery bin 14 may be filled to the desired level without fear of creating a packed plug of granular materials in the T-fitting 22.

When the delivery bin 14 has been filled, the control valve 50 is deenergized allowing the compressed air in the motor means 42 to be exhausted through the vent nozzle 51 while admitting compressed gas through the conduit 49 into the motor means 42. The rod means 40 is displaced upwardly, thereby simultaneously closing the inlet valve means 18 and opening the outlet valve means 26. At the same time, the control circuit 54 opens the control valve 36. Compressed gas is admitted through the auxiliary conduit 34 into the upper region 37, thereby pressurizing the same. Compressed gas is also ejected through the orifice plate 38 so as to entrain the granular materials from the delivery bin 14 through the conveying conduit 24.

In the operation of the system, it may happen that a sudden surge of material through opening 20 into the T-fitting 22 will cause the conduit 24 to become overloaded. When this occurs, an excessive load is imposed on the blower motor 32; and at the same time the pressure in auxiliary conduit 34 and above the material within the bin 14 increases. This increase in pressure, of course, attempts to force additional material down into the already overloaded conduit 24. Accordingly, in order to prevent this condition, a pressure switch 130 is provided in the conduit 34. The pressure switch 130 is such that when the pressure within the auxiliary conduit and above the material in bin 14 rises due to the aforesaid overloading of conduit 24, the switch 130 will close valve 36 through the control circuit 54. When this happens, material is delivered from the hopper 14 to the conveying conduit 24 only by gravity and by the pressure already within the hopper; and, as the hopper continues to empty, the pressure within it returns to its original value, at which time the pressure switch 130 again opens and allows air to be supplied to the top of the material in the hopper.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a system for pneumatically conveying solid granular material, including a delivery hopper having an upper inlet opening and a lower discharge opening, conveying conduit means connected to said delivery hopper in communicating relation with said discharge opening, and means for delivering compressed gas into said conveying conduit means for pneumatically conveying granular materials received from said delivery hopper, the improvement comprising:
   inlet valve means for controlling the flow of granular materials through said inlet opening into said delivery hopper;
   outlet valve means for controlling the flow of granular materials through said discharge opening into said conveying conduit means; rod devices interconnected by a flexible connector and extending between and connecting said inlet valve means to said outlet valve means; and
   means including said rod devices for operating said inlet and outlet valve means in unison such that when said outlet valve means is closed said inlet valve means is open for filling said delivery hopper with granular materials, and when said inlet valve means is closed said outlet valve means is open for discharging granular materials to said conveying conduit means.

2. The improvement defined in claim 1 wherein said rod devices include:
   a first rod segment connected to said outlet plug and extending toward said inlet plug;
   a second rod segment connected to said inlet plug and extending toward said outlet plug;
   said first and second rod segments being aligned and terminating in adjacent rod ends; and
   flexible connecting means for joining said adjacent rod ends to provide for displacement of said outlet plug into mating engagement with said discharge opening for sealing the same.

3. The improvement defined in claim 2 wherein said adacent rod ends have mating convex and concave end surfaces whereby said first rod segment is angularly displaceable in all directions.

4. The improvement defined in claim 1 including:
   gasket means surrounding said inlet opening;
   an inlet plug associated with said valve means, said inlet plug having a leading end movable into said inlet opening to close the same against further influx of granular material and out of said inlet opening to open the same for introducing granular material into said delivery hopper; and
   a sealing surface carried by said inlet plug and positioned to engage said gasket means thereby to effect a substantially gas-tight seal, said sealing surface being inclined relative to the flow path of granular material, said sealing surface being spaced from said gasket means when said leading end of said inlet plug closes said inlet opening to permit substantially all of the granular material to flow from said sealing surface, whereby said sealing surface is substantially free of granular material prior to engaging said gasket means.

5. In combination, a first storage bin for granular materials, means for pressurizing the space above granular material in said first bin, a second storage bin above said first bin, and plug valve means for controlling the flow of granular materials from said second bin to the first bin, said valve means comprising:
   a valve body having an inner perimeter edge defining a flow passageway;
   gasket means surrounding said inner perimeter edge;
   a plug having a leading end positionable in juxtaposition with said perimeter edge to close said flow passageway against further flow of granular material from said valve body;
   means for reciprocating said plug into and out of said flow passageway; and
   a sealing surface on said plug remote from said leading end and engageable with said gasket means to seal said flow passageway after said leading end closes said flow passageway, whereby said sealing surface is substantially free of granular material when said sealing surface engages said gasket means.

6. The improvement defined in claim 5 wherein said sealing surface is inclined outwardly and away from said leading end.

7. The improvement defined in claim 5 wherein said plug comprises:
   a cup-shaped member having a transverse wall and a cylindrical side wall projecting into said flow passageway in telescoping relation with said valve body;
   openings in said cylindrical side wall having substantially coplanar edges positionable in juxtaposition with said perimeter edge of said valve body for closing said flow passageway; and
   a skirt surrounding said transverse wall and being flared outwardly and away from said cylindrical side wall, said skirt presenting said sealing surface.

8. The improvement defined in claim 7 including: a generally funnel-shaped member having its lower portion positioned within said cylindrical side wall of the cup-shaped member and generally coaxial therewith, said funnel-shaped member being open at its bottom and connected at its top to the bottom of said second storage bin whereby material from said second bin must flow through said funnel-shaped member into the second bin, the space between said valve body and said funnel-shaped member defining an annular passageway, and a vent duct connected to said annular passageway.

9. The improvement defined in claim 1 wherein said outlet valve means includes a generally cone-shaped plug member having an apex which fits into said discharge opening when the outlet valve means is closed.

10. The improvement defined in claim 9 including a cone-shaped gasket cover formed from resilient material.

References Cited
UNITED STATES PATENTS

| | | | |
|---|---|---|---|
| 799,808 | 9/1905 | Thompson | 302—55 |
| 1,588,645 | 6/1926 | Barrett | 251—210 |
| 2,931,385 | 4/1960 | Carlisle et al. | 251—210 |
| 3,197,260 | 7/1965 | Kauffmann | 302—55 |

ANDRES H. NIELSEN, *Primary Examiner.*

U.S. Cl. X.R.

302—55